(12) United States Patent
Toskala et al.

(10) Patent No.: US 6,480,554 B1
(45) Date of Patent: Nov. 12, 2002

(54) CHANNEL ESTIMATION IN A CDMA CELLULAR COMMUNICATION SYSTEM

(75) Inventors: Antti Toskala, Helsinki (FI); Ari Hottinen, Espoo (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/184,619

(22) Filed: Nov. 2, 1998

(30) Foreign Application Priority Data

Nov. 3, 1997 (GB) ............................................. 9723221

(51) Int. Cl.[7] .......................... H04L 27/00; H04L 23/00
(52) U.S. Cl. ....................................... 375/340; 375/377
(58) Field of Search ................................ 375/340, 377, 375/341, 316, 262

(56) References Cited

U.S. PATENT DOCUMENTS

| | | | |
|---|---|---|---|
| 5,479,444 A | | 12/1995 | Malkamaki et al. ......... 375/231 |
| 5,619,524 A | * | 4/1997 | Ling et al. ................... 375/130 |
| 5,663,954 A | | 9/1997 | Hakkanen et al. .......... 370/278 |
| 5,818,876 A | * | 10/1998 | Love ........................... 329/304 |
| 5,870,666 A | * | 2/1999 | Tanaka et al. ............. 455/226.1 |
| 6,173,007 B1 | * | 1/2001 | Odenwalder et al. ....... 375/146 |

FOREIGN PATENT DOCUMENTS

| | | | |
|---|---|---|---|
| EP | 0-213-971 A2 | * | 6/1999 |
| GB | 2-330-992 A | * | 5/1999 |
| WO | WO 95/30289 | | 11/1995 |
| WO | WO 96/10879 | | 4/1996 |
| WO | WO 96/24988 | | 8/1996 |

OTHER PUBLICATIONS

"Variable Rate Data Transmissions on Single Code Channels in DS–CDMA" Okumura et al., Technical Report of IEICE (Feb. 1996).
United Kingdom Search Report.

* cited by examiner

*Primary Examiner*—Tesfaldet Bocure
(74) *Attorney, Agent, or Firm*—Perman & Green, LLP

(57) ABSTRACT

A method and circuitry for channel estimation in a cellular communication system is disclosed. Data is transmitted with variable data transmission rates as a plurality of data symbols over a sequence of time slots. Each time slot has at least a proportion containing data symbols, the proportion being dependent on the data transmission rate. An estimate of the transmission rate is determined and is used in channel estimation so that the channel estimation is based on the proportion of received data symbols.

15 Claims, 5 Drawing Sheets

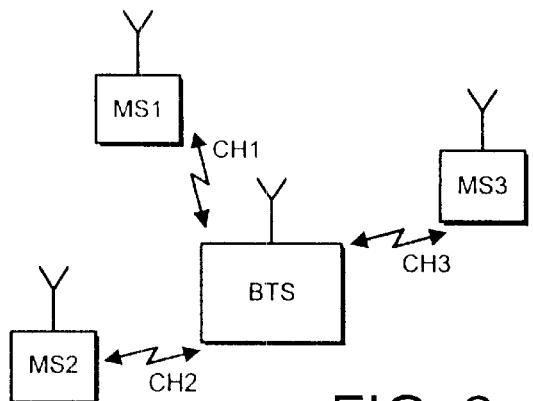
FIG. 2
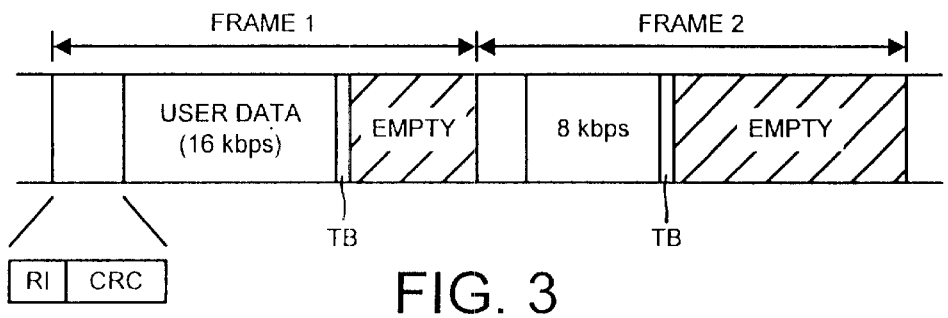
FIG. 3
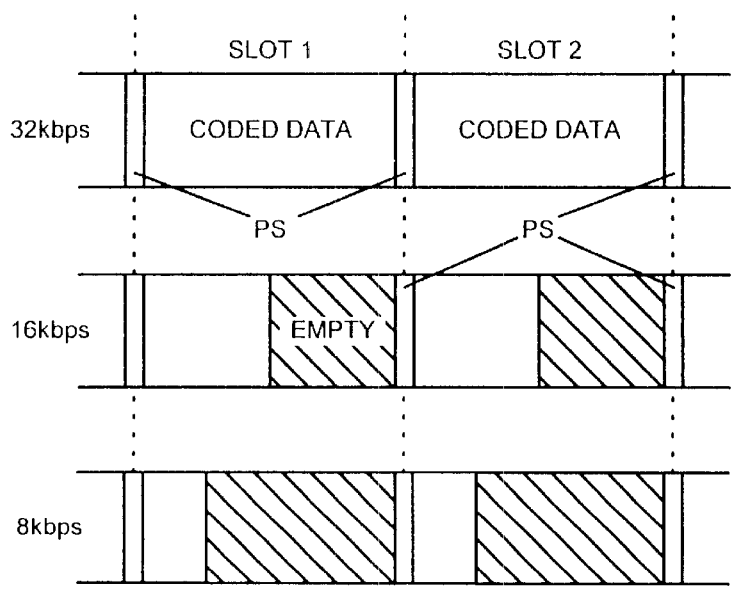
FIG. 4A
FIG. 4B
FIG. 4C

CHANNEL ESTIMATION IN A CDMA CELLULAR COMMUNICATION SYSTEM

BACKGROUND OF THE INVENTION

The present invention relates to a method and circuitry for channel estimation in a CDMA cellular communication system.

FIELD OF THE INVENTION

The invention is particularly concerned with a cellular communication system in which signals are transmitted with variable data transmission rates wherein data is transmitted as a plurality of data symbols over a sequence of time slots. As is known, in a CDMA system data is encoded for transmission by modulating data symbols to be transmitted by a unique spreading code for each channel. Within each cell of a cellular communication system, spreading codes are preferably orthogonal to allow for a plurality of different mobile stations to communicate with a base station on selectively coded channels.

When a signal is transmitted between a base station and a mobile station (either on the uplink or the downlink), the signal receiving unit needs to establish from the signal which it has received some information about the communication path along which the signal has travelled. This is referred to herein as "channel estimation" and is carried out in a channel estimation unit which generates a channel impulse response. Various techniques are known for channel estimation. The channel impulse response is required in order to properly decode and demodulate incoming data.

In an earlier proposed CDMA system explained in the Technical Report of IEICE (1996–02) entitled "Variable Rate Data Transmission on Single Code Channels in DS-CDMA" by Okomura et al, data is transmitted at variable transmission rates. Channel estimation is carried out from pilot symbols spaced periodically in the data stream.

At least two difficulties are associated with this proposal. One is that only the energy from the pilot symbols is available for channel estimation, and the signal to noise ratio of pilot symbols tends to be poor. Thus, filtering is required to get more reliable estimates. In particular in the case of mobile stations moving at high speeds, it may be difficult to apply a suitable filtering technique due to short channel coherence time.

Furthermore, pilot symbols are required only in coherent systems. In a non-coherent system, in which pilot symbols are not present there remains the difficulty of providing reliable channel estimation for variable data transmission rates.

SUMMARY OF THE INVENTION

According to an aspect of the present invention there is provided a method for channel estimation in a cellular communication system with variable data transmission rates wherein data is transmitted as a plurality of data symbols over a sequence of time slots, each time slot having at least a proportion containing data symbols, said proportion being dependent on the data transmission rate and wherein an estimate of the transmission rate is determined and is used in channel estimation so that the channel estimation is based on received data symbols.

The present invention can be used in a CDMA system with discontinuous pilot and variable data rates, because by estimating the transmission rate the channel estimation unit is aware of how much of the frame is filled with data symbols or whether a frame is empty. Thus, decision feedback base coherent channel estimation is possible using all the transmitted data symbols and not just transmitted pilot symbols.

The present invention can be utilised in a situation where data and rate information are encoded on a common code-defined channel for transmission, or where the rate information is transmitted on a parallel control channel. In either case, the estimate of transmission rate can be determined from that rate information.

The invention can also be used in a situation where no rate information is transmitted. In that case, the transmission rate can be estimated as one of a number, preferably small, of known possible transmission rates. The correct one can be determined by error checking procedures after decoding of data.

However, it is preferred if the estimate of transmission rate is determined further upstream in the signal processing sequence for received signals and thus in the preferred embodiment of the invention the estimate of transmission rate is based on the data structure in each time slot prior to decoding said rate information. For that purpose, an additional rate estimation unit is provided distinct from the rate detection unit which decodes the rate information.

The rate information could be derived from the spreading code structure on the data channel.

The estimate of transmission rate which is determined based on the data structure in each time slot can usefully be used in other parts of the received signal processing sequence. For example, it can be used to assist in rate selection for Viterbi decoding of the incoming data symbols, or to assist in decision of an alternative transmission rate for decoding if an error check fails.

The invention is applicable in a situation where pilot symbols are provided for coherent transmission, but also in a non-coherent communication system where no pilot symbols are transmitted.

According to another aspect of the present invention there is provided signal receiving circuitry for use in a cellular communication system with variable data transmission rates wherein data is transmitted as a plurality of data symbols over a sequence of time slots, each time slot having at least a proportion containing data symbols, said proportion being dependent on the data transmission rate, the signal receiving circuitry comprising:
 a rate estimation unit for receiving incoming data symbols and determining therefrom an estimate of the transmission rate; and
 a channel estimation unit which utilises the estimated transmission rate of the received data symbols in channel estimation.

The signal receiving circuitry can also include a rate detection unit which decodes rate information transmitted with the data symbols.

The signal receiving circuitry can be provided in a mobile station or base station.

In the rate estimation unit, detection of an estimated transmission rate can be done based on the data structure in each time slot as for low data rates part of the time slot is empty and the rate estimation unit can detect if transmission is switched off part of the slot. As an example, a 10 ms frame can consist of several slots which generally have the same structure, so the rate estimation unit can measure the breakpoint (switch off point) from several slots and average over all the slots. This information can be compared with the rate decoded from the rate information by the rate detection unit.

The following described embodiment of the present invention provides several advantages.

The energy of received data symbols in addition to that of pilot symbols is available for channel estimation.

The rate estimation unit is able to detect some properties of the data structure and thus knows when transmission in each frame should end. Thus, verification of the encoded rate information is allowed.

As the rate estimation unit provides additional information concerning the transmission rate, corrective actions can be taken on the basis of this. If the allowed number of transmission rates is relatively small, the rate estimation unit can determine the most probable actual transmission rate and further signal detection can proceed based on that information.

For a better understanding of the invention and to show how the same may be carried into effect reference will now be made by way of example to the accompanying drawings.

BRIEF DESCRIPTION OF THE DRAWINGS

FIGS. 1A and 1C in combination represent a second embodiment of transmission and reception circuitry in a mobile station;

FIG. 2 is a block diagram of a mobile communication system;

FIG. 3 is an illustration of a transmission frame structure;

FIGS. 4A to 4C are illustrations of transmission time slot structures at variable data transmission rates;

DESCRIPTION OF THE PREFERRED EMBODIMENT

Figure 1A:
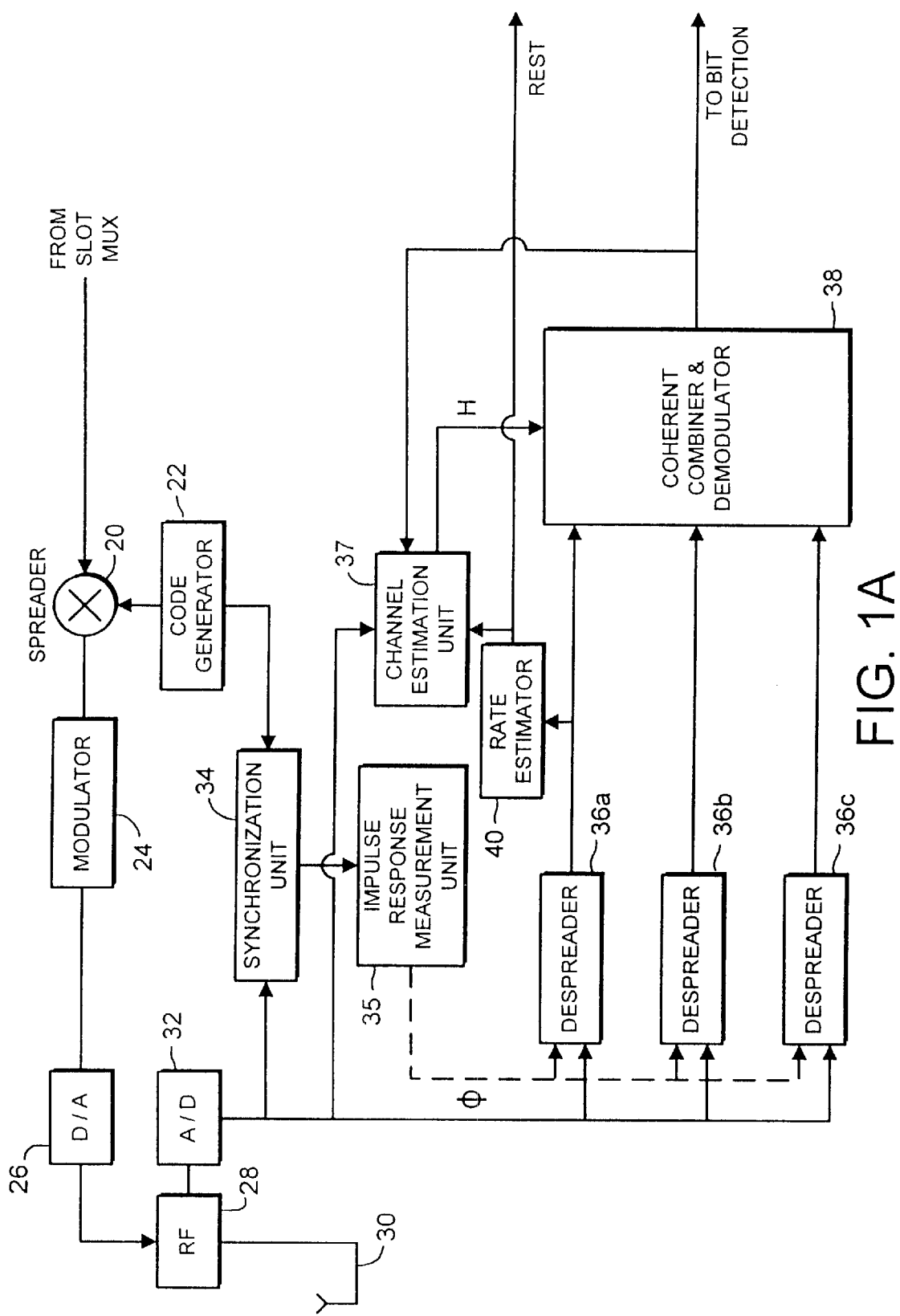
FIGS. 1A and 1B in combination illustrate a first embodiment of transmission and reception circuitry in a mobile station.
Figure 1B:
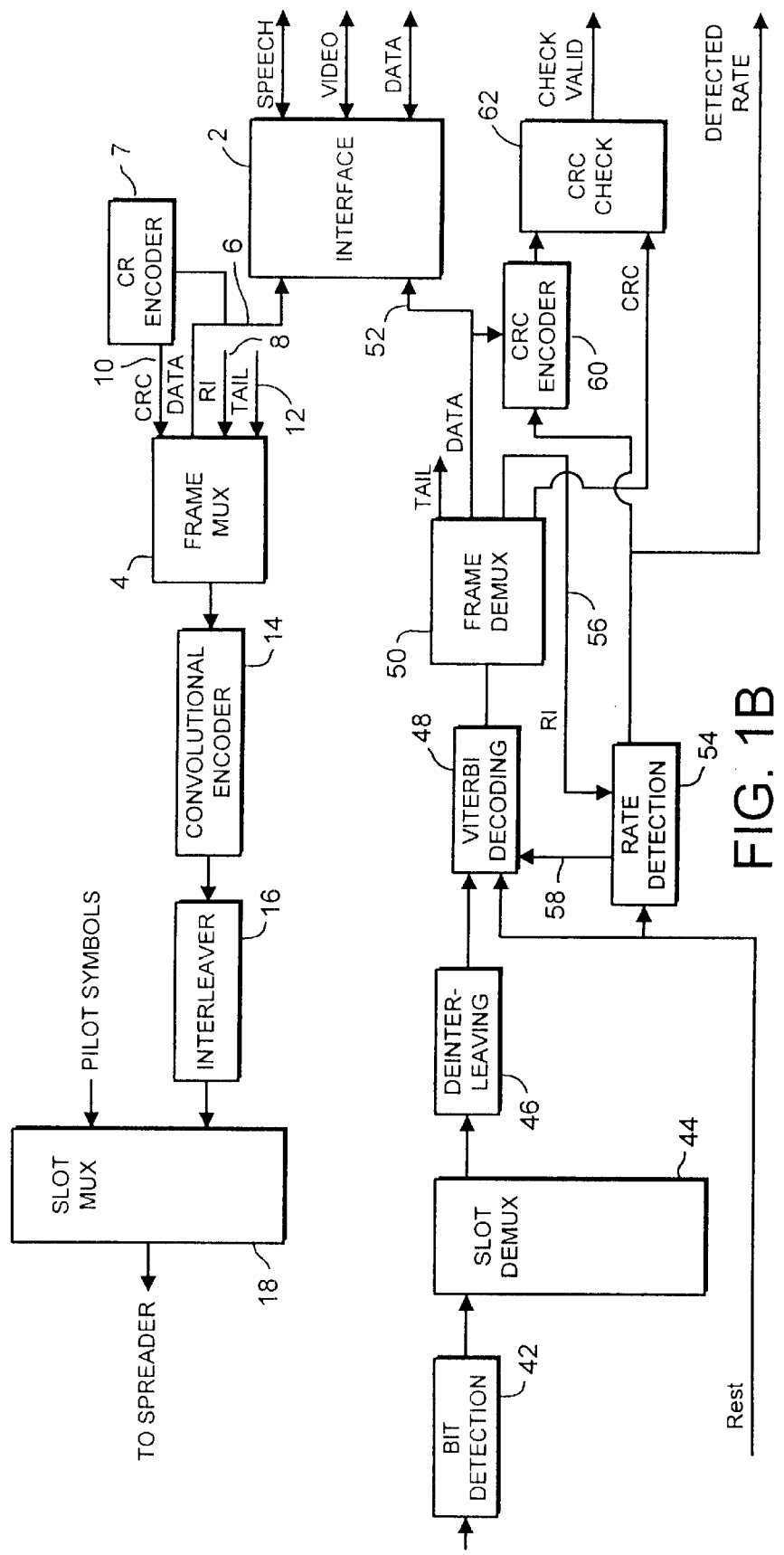

FIGS. 1A and 1B are a block diagram of transmit and receive circuitry at a mobile station (MS) in a CDMA system. FIG. 2 is a block diagram illustrating a context in which the present invention may be used. That is, a CDMA mobile communication system allows a plurality of mobile stations MS1, MS2, MS3 to communicate with a base station BTS in a common cell via respective channels CH1, CH2, CH3. These channels are distinguished from one another by the use of spreading codes in a manner which is know per se. Reverting now to FIG. 1B, the transmit circuitry within a mobile station will be described first. Data to be transmitted, which may be speech data, video data or other data is supplied to the MS interface 2. It is encoded into a form suitable for transmission at a bit rate $T_b$ which is dependent on the source of the data. For example, the transmission rate could be 8 kbps, 16 kbps or 32 kbps. The encoded user data is supplied to a frame multiplexer 4 together with a rate information sequence RI which identifies the bit rate. The user data is supplied to the frame multiplexer 4 along line 6 in FIG. 1B and the RI sequence is supplied along line 8 in FIG. 1B. In addition, the user data is supplied to a CRC encoder 7 which generates a check sequence (CRC) for each frame of data. The CRC sequence is supplied to the frame multiplexer along line 10. In addition, an error correction tail bit defining the end of each user data sequence is supplied to the frame multiplexer along line 12. The frame multiplexer 4 organises the data for transmission into a frame sequence as illustrated for example in FIG. 3. That is,. a first part of each frame contains the RI sequence and the CRC sequence, followed by the user data, the tail bit and, if the bit rate is less than 32 kbps, an empty part of the frame. Typically, the user data is divided into frame periods of 10 milliseconds each. Each frame can have a different transmission rate, as identified by the RI sequence. Thus, it is possible to multiplex data from different sources into the frame sequence for transmission.

The frame sequence is supplied to a convolutional encoder 14 and a bit interleaver 16. These circuits carry out convolutional coding and bit interleaving in a manner which is known in the art and which will not be described further herein. The purpose of the convolutional encoding is to protect the user data from errors in a radio channel so that a (Viterbi) decoder can recover the coded data even if some bits are corrupted. Bit interleaving spreads burst errors which typically occur in mobile radio channels more evenly in time to allow the decoder to more efficiently correct the errors from the coded data.

At a slot multiplexer 18, pilot symbols (PS) are introduced into the time slots with the encoded data to generate a slot sequence as illustrated in FIGS. 3A to 3C for differing transmission rates. Typically, each time slot has a duration of 0.625 milliseconds, and thus has a minimum bit capability of 20 bits (depending on the chip rate Tc), based on the maximum transmission rate of 32 kbps. It will thus readily be appreciated that for a transmission rate of 16 kbps, half of each time slot will be empty, and for a transmission rate of 8 kbps, three-quarters of each time slot will be empty. That is, no data will be transmitted during the empty time period of each time slot. The pilot symbols (PS) are introduced at the beginning and end of each time slot in a coherent system. These symbols are readily recognisable and so the beginning and end of each time slot can be identified for synchronisation purposes. In a non-coherent system, these pilot symbols are not necessary.

The slot sequence is supplied to a spreader 20 which receives a spreading code from a code generator 22. The spreading code is generated in accordance with known CDMA techniques and will not be described further herein. Its effect is to spread the frequency band for transmission to a chip rate Tc which is larger than the bit rate $T_b$. The spreading code is unique for each mobile station transmitting to a single base station so that the transmission from individual mobile stations can be distinguished at the base station. The codes are designed to be as far as possible orthogonal between different mobile stations.

If M parallel code channels are employed, M data symbols are spread using different codes and then the results are summed together.

After spreading, the spread signal is supplied to a modulator 24 which modulates the signal ready for transmission, for example according to QPSK modulation. In some systems, modulation is carried out prior to spreading. This sequence of events has no impact on the present invention. The spread, modulated signal is supplied to a digital to analogue (D/A) converter 26 and from there to an RF unit 28 which supplies the signal ready for transmission via an antenna 30.

As can be seen, with the transmission circuitry described above, the rate information is encoded as the RI sequence as part of the frame structure for transmission on a single transmission channel. It is thus possible to provide different transmission rates in different frames of the frame sequence. Moreover, it is not necessary to have a separate control channel transmitting continuously at a constant transmission rate. Nevertheless, the invention can be used also in the context of a separate control channel.

The reception side of the mobile station will now be described. Signals incoming at the antenna 30 are received by the RF unit 28 and supplied to an analogue to digital (A/D) converter 32. It will readily be understood that a signal may arrive at the mobile station having experienced multipaths with differing propagation delays dn. The A/D converter 32 supplies the digital input signal to a synchronisation unit 34, a channel estimation unit 37 and to each of a number of despreaders 36a, 36b, 36c. The number of despreaders depends on the likely number of paths experienced by the signal from the base station to the mobile station and is thus dependent on the environment. The synchronisation unit 34 handles the synchronisation of the mobile station to the base station BTS after power has been turned on as well as in a handover case. This includes searching for signals which have been transmitted with the unique spreading code for that mobile station. Thus, the synchronisation unit 34 receives the unique code from the code generator 22. To perform the search function, synchronisation unit utilises the unique code from the code generator 22 and correlates it with the incoming signal until a strong correlation is detected. After the synchronisation procedure is completed, a dedicated traffic channel can be established. An impulse response measurement unit 35 deals with estimation of the propagation delays dn in order to be able to provide each despreader 36a, 36b, 36c with required spreading code phases φ. The phase value of the strongest correlation is supplied to the first despreader 36a and the process is continued to supply respective phase values φ to the remaining despreaders 36b and 36c. Respective code generators within the despreaders 36a to 36c can thus be used to despread the signal in accordance with the determined phase difference and the resulting narrowband signals are supplied to a coherent combiner and demodulator unit 38. The narrowband signals corresponding to each propagation path must be coherently combined to get the optimum performance. For this reason, channel tap complex multipliers corresponding to each propagation path need to be estimated. This is accomplished in the channel estimation unit 37. The channel estimation unit 37 generates an impulse response H in the form of a small number of energy tap values denoting the signal strength and relative delay of the signal components. Demodulation is also carried out in the coherent combiner and demodulation unit 38. This can either be done in relation to each despread signal before they are combined, or on the combined signal itself.

The channel estimation unit 37 receives the wideband signal from the A to D converter 32 from which known pilot symbols in the beginning of each time slot are utilised in channel phase and amplitude estimation. The signal to noise ratio of the pilot symbols however tends to be poor and thus channel estimation based on the pilot symbols alone is not entirely satisfactory. It is desirable to utilise data symbols in the channel estimation process as well as the pilot symbols, but this is not easily accomplished.

A more detailed explanation of the search and channel estimation unit, despreader unit and combiner unit may be found in our earlier Application WO96/24988, the contents of which are herein incorporated by reference. However, the system described in that application assumes that the transmission rate is substantially constant, and therefore a signal can be expected over the entirety of the time slot. The difficulty that arises with a variable transmission rate is that in some time slots the transmission may occur for only a portion of the time slot, as illustrated by the slot structures of FIGS. 3A to 3C. Thus, channel estimation cannot be carried out on data symbols within a time slot due to uncertainties as to whether or not the data would actually exist. The channel estimation would be confused by the parts of the time slot in which there was no transmission. Also, if parallel data and control channels are provided, the use of the data channel for channel estimation is not possible without knowledge of the data channel existence and spreading ratio.

The illustrated circuit overcomes this by providing a rate estimator 40 which is connected to receive the despread signal from the despreader 36a. This is assumed to be the strongest signal (i e that which has come in along the primary path). It would be possible, but more complex, to supply information from a plurality of the despreaders to the rate estimator. The rate estimator 40 estimates the transmission rate which has been utilised by examining the structure of the despread data. The rate estimator includes a circuit for determining the "break point" within each time slot by examining the transmitted power in the time slot. The break point is the point within each time slot after which data ceases to be transmitted. FIG. 4A illustrates an example of sampled data after despreading over two time slots for a transmission rate of 16 kbps. The dots in FIG. 4 represent samples values of the despread signal at the bit sampling rate. The rate estimator measures the number k of samples per slot and takes an average over all the slots. In the present example, there are 16 slots in a frame so it would be appropriate to take an average value over 16 slots. The equivalent number K of soft values in the frame can thus be computed. This information is passed to the channel estimator as an estimated rate Rest. In fact, the estimated rate is not a numerical indication of the bit rate, but an indication of how much of each time slot is filled with data, or whether the time slot is empty. In practice Rest is represented as a breakpoint location in relation to the slot length. This allows channel estimation to be carried out using the transmitted data symbols which are present in the time slot, and for that purpose the combined, demodulated signal on the narrowband side is fed back to the channel estimation unit.

Several alternative circuit structures are possible to implement the above rate estimation concept. In one, channel estimation could occur after despreading has taken place, i.e. only on the narrowband side, in which case the rate estimator could be located within the channel estimation unit itself. Another possibility is to locate the rate estimator after the combined, despread data. The advantage of this is that the energy available for detection in the rate estimator is greater. However, it is generally advisable to have the rate estimation carried out as soon as possible in the process so that it does not hold up the channel estimation for longer than is necessary.

The combined demodulated signal is supplied to a bit detection unit 42 which makes a soft or hard decision on the received symbols as to the transmitted bits. The detected bit sequence from the bit detection unit 42 is supplied to a slot demultiplexer 44 which demultiplexes the slot structure. The demultiplexed slot structure is then supplied to a deinterleaving unit 46 which effectively undoes the action of the interleaver 16. The deinterleaved signal is supplied to a Viterbi decoding unit 48. The Viterbi decoding unit also receives the estimated rate Rest from the rate estimator 40. It will readily be apparent that the Viterbi decoding unit can only operate effectively if it knows something about the transmission rate of the data. In the embodiment of FIG. 1B, the estimated rate thus provides the Viterbi decoding unit 48 with additional information for making rate based decisions. The decoded signal is supplied to the frame demultiplexer So from which the tail bit, user data, CRC sequence and RI sequence are recovered. The user data is supplied to the transmission interface 2 along line 52. The rate information sequence RI is supplied to a rate detection unit 54 along line 56. The rate detection unit compares the decoded rate information with the estimated rate Rest which it receives from the rate estimator 40. If there is a match, then it is assumed that the rate is valid and the decoding of the data is likely to be good. If there is a mismatch, a signal is supplied to the Viterbi decoding unit along line 58 to allow the Viterbi decoding unit to make a different rate decision for decoding.

An additional check on the rate information, and also on the validity of the data itself, is accomplished by supplying the user data 52 to a CRC encoder 60 which generates a CRC sequence from the received user data. That CRC sequence is checked against the CRC sequence derived from the incoming data in a CRC check unit 62. If the check is valid, then it is assumed that the rate information and the data are good. If the CRC check fails, the estimated rate supplied to the Viterbi decoding unit can be used to make a next guess at the likely transmission rate for decoding.

Figure 1C:
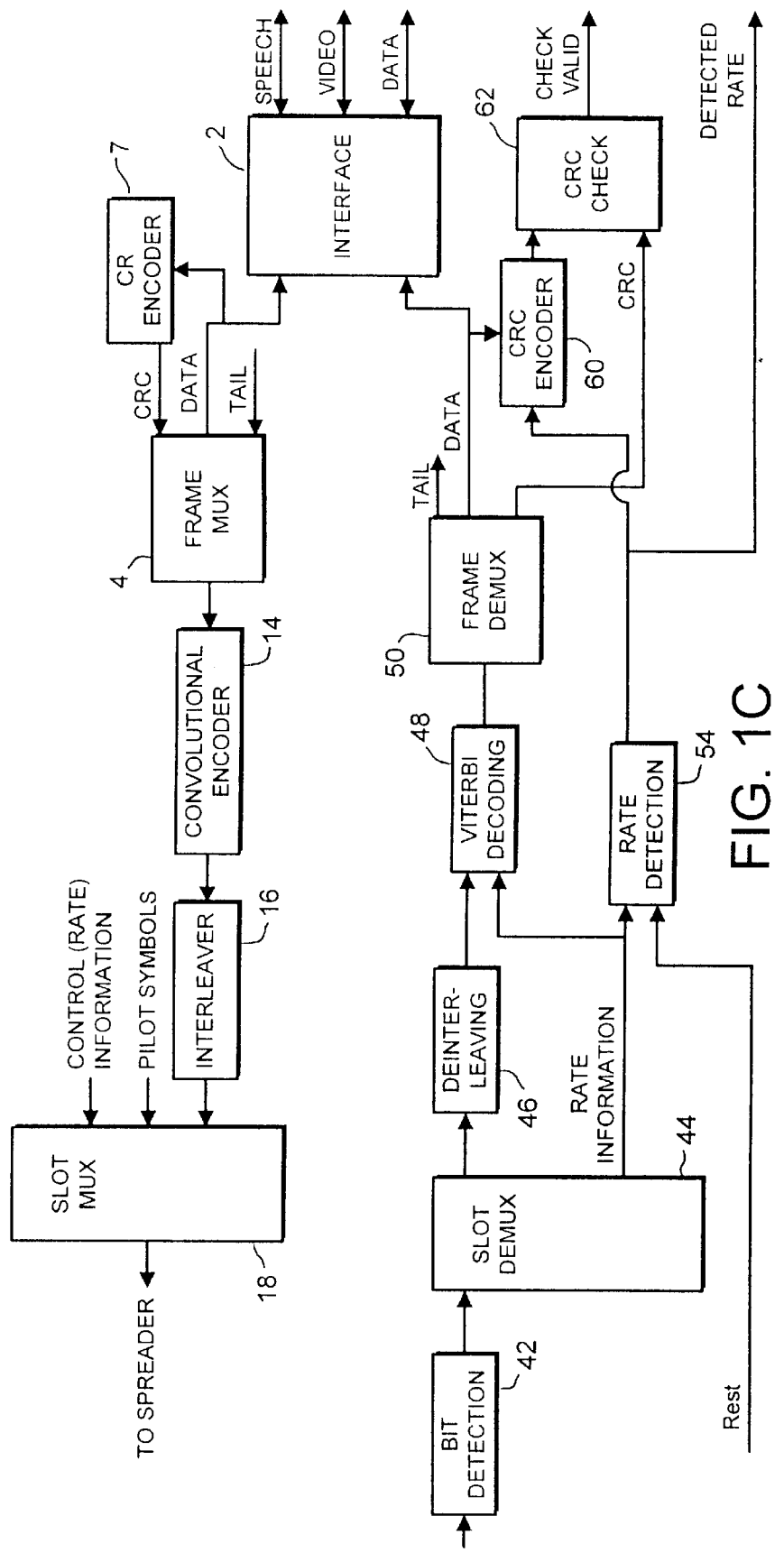
Figure 5:
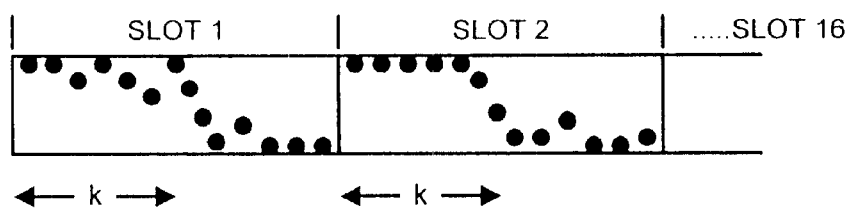
FIG. 5 is a representative illustration of sampled data within two time slots.

An alternative embodiment of the invention can be implemented with the circuitry illustrated in the combination of FIGS. 1A and 1C. This differs from the embodiment described above in that rate information is introduced into the signal prior to transmission at the same time as the pilot symbols, that is at the slot multiplexer 18. Thus, the rate information can be obtained at the output of the slot demultiplexer 44 and supplied to the rate detection unit 54 and the Viterbi decoding unit 48 in place of the estimated rate in the embodiment of FIGS. 1A and 1B. However, the estimated rate Rest determined by the rate estimator 40 would still be used to assist in channel estimation in the manner described above. In the embodiment of FIGS. 1A and 1C, the estimated rate could nevertheless be additionally supplied to the rate detection unit and/or the Viterbi decoding unit 48 for further assisting in rate based decisions.

While the embodiment of the invention described above is located in a mobile station, it will readily be appreciated that a similar arrangement can be applied at the base station. Similar circuitry can be utilised, except of course in the base station there may be a plurality of different code generators capable of detecting incoming signals from a plurality of different mobile stations on different code defined channels. However, the principles of the invention remain unaltered in its application in a base station.

Figure 6:
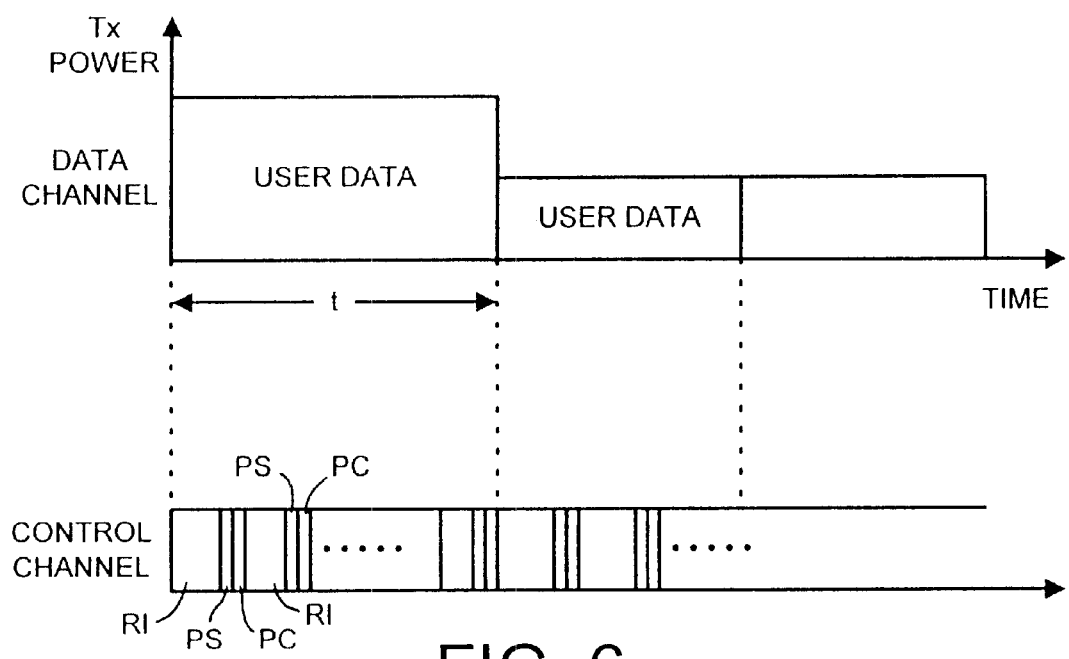
FIG. 6 is a diagram showing separate data and control channels.

While the invention has been described above in relation to a single code defined channel, on which the rate information and data symbols are multiplexed, it will be appreciated that the invention can also be applied in a system where data is separated on a code defined data channel and control information including pilot symbols, transmission power commands and rate information is located on a control channel defined by a separate spreading code. FIG. 6 illustrates such a case, where the data channel has user data in which the height of each block indicates the transmitted power level (Tx power) which corresponds to the data rate. Each frame has a duration t of for example 10 ms. The control channel contains rate information RI, transmission power commands PC and pilot symbols PS. For zero rate there is no user data block for the particular frame. These channels can be combined to form a single transmitted signal: for example in the case of BPSK data and control channels, a QPSK signal could be formed of the two BPSK type channels.

In such a system, the estimated rate Rest can indicate, in the simplest form, whether the data channel exists or not as when it is present the data channel would then be continuous and the simplest solution is data on (full rate) or off (zero rate). Alternatively, a more complex solution offers the possibility to examine the existence and spreading code ratio estimated in the data channel to see whether the data channel can be used for channel estimation.

Moreover, the concept of the invention can be utilised in the case of parallel code channels, where the channel estimator can detect which code channels are active and the rate estimator can determine the rate on the channels for the studied user.

Although the invention has been described in the context of a CDMA system, it will be appreciated that similar principles can be applied in other communication systems, for example TDMA.

While the invention has been described in connection with the use of explicit rate information, in the case of simple services, such as speech, the methods could be used with blind rate detection with both multiplexing options. Blind rate detection means that rate information bits are not used but the rate is determined for example by decoding all the possible rate combinations and checking the CRC code to determine which was the correct transmission rate. This is a viable alternative when there are very few different transmission rates in use.

What is claimed is:

1. A method for channel estimation in a cellular communication system with variable data transmission rates wherein data is transmitted as a plurality of data symbols over a sequence of time slots, each time slot having at least a proportion containing data symbols, said proportion being dependent on the data transmission rate and wherein an estimate of the transmission rate is determined based on said proportion of data symbols and is used in channel estimation so that the channel estimation is based on received data symbols.

2. A method according to claim 1, in which data and rate information are encoded on a common code-defined channel for transmission.

3. A method according to claim 1, wherein said data symbols are transmitted on a code-defined data channel and rate information is transmitted on a parallel control channel.

4. A method according to claim 2, wherein the estimate of transmission rate is based on the data structure in each time slot prior to decoding said rate information.

5. A method according to claim 3, wherein the estimate of transmission rate is based on the spreading code structure on the data channel.

6. A method according to claim 1, wherein the estimate of transmission rate is used to assist in rate selection for Viterbi decoding of the received data symbols.

7. A method according to claim 1, wherein the received data symbols are decoded based on a first transmission rate derived from rate information transmitted with the data, and an error check is carried out on the decoded data, said estimate of transmission rate being used to assist in generating a second transmission rate for decoding the received data symbols if the error check fails.

8. A method according to claim 1, wherein pilot symbols are transmitted with the data and are also used in channel estimation.

9. A method according to claim 1, wherein no rate information is transmitted and the transmission rate is estimated on the basis of a number of possible known transmission rates.

10. Signal receiving circuitry for use in a cellular communication system with variable data transmission rates wherein data is transmitted as a plurality of data symbols over a sequence of time slots, each time slot having at least a proportion containing data symbols, said proportion being dependent on the data transmission rate, the signal receiving circuitry comprising:

a rate estimation unit for receiving incoming data symbols and determining therefrom an estimate of the transmission rate based on said proportion of data symbols; and a channel estimation unit which utilises the estimated transmission rate of the received data symbols in channel estimation.

11. Signal receiving circuitry according to claim 10, wherein the rate estimation unit estimates the transmission rate based on the data structure in each time slot.

12. Signal receiving circuitry according to claim 10, wherein rate information is transmitted with the data symbols and wherein the signal receiving circuitry comprises a rate detection unit for decoding said rate information.

13. A mobile station including signal receiving circuitry, said signal receiving circuitry comprising:

a rate estimation unit for receiving incoming data symbols which are transmitted over a sequence of time slots, each time slot having at least a proportion containing data symbols, said proportion being dependent on the data transmission rate, said rate estimation unit being operable to determine an estimate of the transmission rate from the proportion of incoming data symbols; and a channel estimation unit which utilises the estimated transmission rate of the received data symbols in channel estimation.

14. A base station including signal receiving circuitry, said signal receiving circuitry comprising:

a rate estimation unit for receiving incoming data symbols which are transmitted over a sequence of time slots, each time slot having at least a proportion containing data symbols, said proportion being dependent on the data transmission rate, said rate estimation unit being operable to determine an estimate of the transmission rate from the proportion of incoming data symbols; and a channel estimation unit which utilises the estimated transmission rate of the received data symbols in channel estimation.

15. A method for channel estimation in a cellular communications system with variable data transmission rates wherein data is transmitted as a plurality of data symbols over a sequence of time slots, and wherein rate information is transmitted with the data, wherein each time slot has at least a proportion containing data symbols, said proportion being dependent on a data transmission rate, and wherein an estimate of the transmission rate is determined based on said proportion of data symbols in each time slot prior to decoding said rate information.

\* \* \* \* \*